United States Patent [19]
Goto et al.

[11] 3,869,858
[45] Mar. 11, 1975

[54] EXHAUST GAS PURIFYING SYSTEM FOR MOTOR VEHICLES

[75] Inventors: Kenji Goto; Ryozo Mitsui; Norikatsu Ishikawa, all of Shizuoka-ken, Japan

[73] Assignee: Toyota Jidosha Kogyo Kabushiki Kaisha, Toyota-shi, Aichi-ken, Japan

[22] Filed: July 23, 1973

[21] Appl. No.: 381,446

[30] Foreign Application Priority Data
Aug. 23, 1972 Japan.............................. 47-83620

[52] U.S. Cl................. 60/290, 60/301, 60/306, 137/625.5
[51] Int. Cl. ...... F02b 75/10, F01n 3/14, F01n 3/16
[58] Field of Search ............ 60/289, 290, 307, 301, 60/306; 137/609, 610, 513.3, 625.29, 625.5, 625.48

[56] References Cited
UNITED STATES PATENTS

| | | |
|---|---|---|
| 2,935,084 | 5/1960 | Crawford........................ 137/625.5 |
| 3,106,820 | 10/1963 | Schaffer.............................. 60/290 |
| 3,662,540 | 5/1972 | Murphey.............................. 60/301 |
| 3,672,393 | 6/1972 | Klassen.............................. 137/609 |
| 3,757,521 | 9/1973 | Tourtellotte......................... 60/301 |
| 3,771,562 | 11/1973 | Curran........................... 137/625.48 |
| 3,826,089 | 7/1974 | Nakajima............................ 60/301 |

*Primary Examiner*—Douglas Hart
*Attorney, Agent, or Firm*—Toren, McGeady and Stanger

[57] ABSTRACT

An exhaust gas purifying system for motor vehicles includes a flow control valve which is operable in response to a warmup condition, acceleration condition, or other operating condition of the engine to supply secondary air selectively to either reduction treatment means or oxidation treatment means which are installed in the exhaust system for treating the exhaust gases.

5 Claims, 3 Drawing Figures

PATENTED MAR 11 1975  3,869,858

3,869,858

EXHAUST GAS PURIFYING SYSTEM FOR MOTOR VEHICLES

BACKGROUND OF THE INVENTION

1. Field of Invention

This invention relates to an exhaust gas purifying system for motor vehicles and more particularly to a system for supplying secondary air selectively to either exhaust reducing means or oxidizing means installed in the exhaust system according to the warmup condition, acceleration condition, or other operating condition of the engine.

DESCRIPTION OF THE PRIOR ART

As an approach of the purification of exhaust gases from automobiles, it has heretofore been proposed to remove from the exhaust gases noxious constituents, that is, carbon monoxide, hydrocarbons, and oxides of nitrogen, by oxidizing and reducing them in the exhaust system. Typical of the various arrangements thus far developed to realize the aforementioned objectives includes connecting a reducing-catalyst converter and an oxidizing-catalyst converter to the exhaust pipe and installing a manifold reactor in the exhaust manifold so that the harmful emissions can be eliminated by reduction of NOx (oxides of nitrogen) in the reducing-catalyst converter and by an oxidation reaction of CO and HC with secondary air in either the oxidizing-catalyst converter or the manifold reactor. To attain a high purification efficiency with such catalyst converters, optimum amounts of supplementary or secondary air must be supplied to the exhaust gases passing through the catalyst beds. It should also be noted that the formation of the undesired constituents depends upon the engine temperature in that for a period of time after a cold start, the engine produces large proportions of CO and HC and a minor proportion of NOx, but after the engine is warmed up, the NOx content increases sharply. In order to effect an improvement in the efficiency of exhaust purification, therefore, it is important to ensure an optimum supply of secondary air for the operating conditions of the engine.

Other features which are considered as characteristic for the invention are set forth in the appended claims.

Although the invention is illustrated and described in relationship to specific embodiments, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

SUMMARY OF THE INVENTION

With the foregoing in view, the present invention has for its object the provision of an emission control system capable of optimumly controlling the supply of secondary air to achieve an improved exhaust purification effficiency through reduction and oxidation reactions.

DESCRIPTION OF THE PREFERRED EMBODIMENTS

Figure 1:
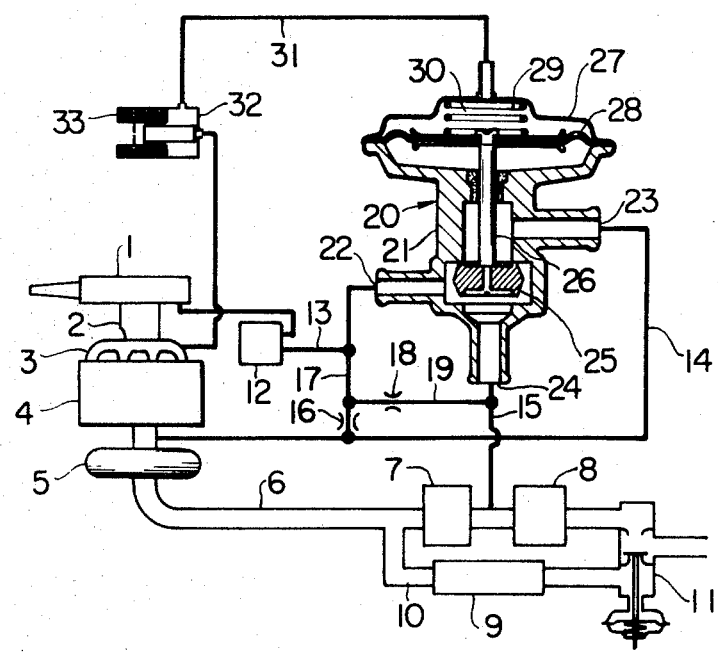
FIG. 1 is a schematic view, partly in section, of a purifying system according to one enmbodiment of the present invention.

Referring specifically to FIG. 1, which illustrates the first embodiment of the invention, there is shown an air cleaner 1, a carburetor 2, an intake manifold 3, an engine body 4 supporting the aforementioned components, a manifold reactor 5 connected to the non-illustrated exhaust port of the engine body 4, an exhaust pipe 6 connected to the shell of the manifold reactor 5, a reducing-catalyst converter 7, and an oxidizing-catalyst converter 8. Both of the latter mentioned converters 7,8 are connected to the exhaust pipe 6. The exhaust pipe 6 in turn is connected to a bypass pipe 10 which carries a premuffler 9 as a bypass from the exhaust pipe 6 in which both catalyst converters 7,8 are installed.

Where the downstream ends of the two pipes 6,10 meet, there is installed a change-over valve 11 of the diaphragm type which operates with manifold vacuum so that when the catalyst temperatures approach levels high enough to have adverse effects upon the catalyst life, the exhaust gases are led to the bypass pipe 10 and undue heating of the catalyst converters 7,8 is prevented. In the exhaust gas purifying line described above, an air pump 12 driven by the non-illustrated crankshaft of the engine 4 is provided in such a way as to feed secondary air from the air cleaner 1 to a flow control valve, generally at 20, via a hose 13.

The flow control valve 20 comprises a valve casing 21 formed with a suction port 22 and two discharge ports 23 and 24, a disk 25 for changing over the flow direction to establish communication between the suction port 22 and either discharge port 23 or 24, a valve stem 26 supporting the disk 25 at one end, and a diaphragm case 27 in which a diaphragm 28 is connected on its underside to the other end of the valve stem 26 and is connected on the upper side to a spring 29. A hose or pipe 13 is connected to the suction port 22. One discharge port 23 of the flow control valve 20 is in communication with the manifold reactor 5 by a pipe 14 and the other discharge port 24 is in communication with the exhaust pipe 6 between the catalyst converters 7,8 by a pipe 15. The pipe 13 is in communication with the pipes 14 and 15, respectively, by means of a bypass pipe 17 having an orifice 16 and a bypass pipe 19 having an orifice 18.

The diaphragm chamber 30 of the flow control valve 20 is connected to the intake manifold 3 by means of a hose 31 equipped with a three-way, solenoid-operated, directional control valve 32 so that when the solenoid 33 is energized, communication is established to exert or apply negative pressure in the manifold 3 upon the diaphragm 28. When the solenoid 33 is de-energized communication with the vacuum in the manifold 3 is terminated and the diaphragm 28 is subjected or exposed to atmospheric pressure.

With the construction described above, the system according to the present invention operates in the following manner. During cold starting and until the engine warms up sufficiently, the solenoid 33 remains de-energized and atmospheric pressure is maintained in the diaphragm chamber 30 by the three-way, solenoid-operated valve 32. In the flow control valve 20, the diaphragm 28 is disposed in a lower position due to the bias of the spring 29 and this position of the diaphragm 28 causes the disk 25 to close the discharge port 24 while providing communication between the suction port 22 and the other discharge port 23. Consequently, most of the secondary air from the air pump 12 is supplied to the manifold reactor 5 via the pipe 14, thus enabling the reactor 5 to burn away the CO and HC that are produced in large quantities while the engine is cold.

At this point an oxidizing atmosphere is maintained in the inlet of the reducing-catalyst converter 7 and the reducing catalyst acts like an oxidizing catalyst to reduce the proportions of CO and HC. Further, the secondary air from the hose 13 is conducted through the bypass pipe 19 into the portion of the exhaust pipe 6 immediately before the oxidizing-catalyst converter 8. When the engine has warmed up, the solenoid 33 is energized and the three-way, solenoid-operated, directional control valve 32 is operated, with the result that the manifold vacuum acting in the diaphragm chamber 3 of the flow control valve 20 overcomes the biasing force of the spring 29 and lifts the diaphragm 28 by suction, whereby the disk 25 then provides communication between the suction port 22 and the discharge port 24. This directs most of the secondary air from the hose 13 into the oxidizing-catalyst converter 8 through the pipe 15. As a result the oxidation reaction by the oxidizing catalyst is promoted and the CO and HC content of the exhaust gases is decreased.

Part of the secondary air flows through the bypass pipe 17 into the manifold reactor 5 where it induces a partial oxidation reaction and, at the same time, attains an optimum exhaust-air mixing ratio at the inlet of the reducing-catalyst converter 7 for the reduction and purification of the exhaust gases. In this way the large proportion of NOx present in the exhaust gases is removed with a high degree of purification efficiency.

If the air-to-fuel mixture is made too rich by a power jet or other means due to a heavy load imposed on the engine following warmup, the manifold vacuum decreases to such an extent that the suction port 22 of the flow control valve 20 is again communicated with the discharge port 23 to supply most of the secondary air to the manifold reactor 5. This permits the manifold reactor 5 to reduce the CO and HC proportions in the exhaust gases, and provides an optimum exhaust-air mixing ratio at the entry of the reducing-catalyst converter 7 for control of NOx. In this case, in the same manner as already described, part of the secondary air is admitted into the oxidizing-catalyst converter 8 to help convert much of the residual CO and HC into harmless gases.

Thus, according to the present invention, the supply of secondary air is in large measure directed to the manifold reactor 5 while part of the secondary air is directed to the oxidizing-catalyst converter 8, the extent of the division depending upon the warmup or accelerating conditions of the engine. The flow rate of air is controlled by a suitably selected opening of the orifice 16 or 18 of the bypass pipe 17 or 19, respectively, whereby the purification in the manifold reactor 5, reducing-catalyst converter 7, or oxidizing-catalyst converter 8 can be carried out under optimum conditions.

Figure 2:
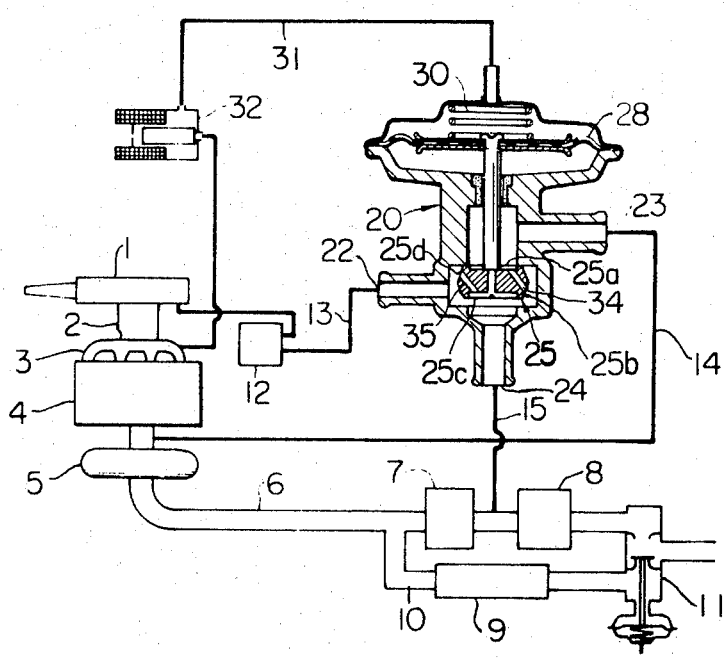
FIG. 2 is a similar view showing another embodiment of the invention.
Figure 3:
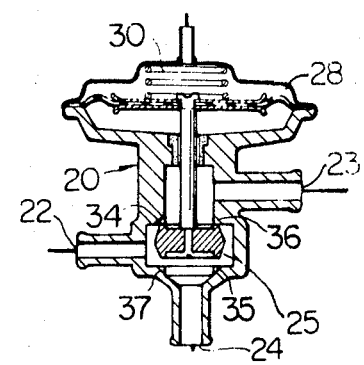
FIG. 3 is a sectional view of still another form of a flow control valve according to the invention.

FIG. 2 shows another embodiment of the invention wherein the function of the bypass pipes 17, 19 and then associated orifices 16, 18 used in the first embodiment of FIG. 1 are integrally incorporated in the flow control valve 20. In FIG. 2 the disk 25 of the valve 20 is formed with a slanting air passage 34 having one end opening in the upper surface 25a and the other end opening in one side 25b. A similar slanting air passage 35 extends between the underside 25c and the other side 25d of the disk 25. When the disk 25 has terminated the communication between the suction port 22 and discharge port 23 or 24, a certain amount of air is supplied through the passage 34 or 35 to the discharge port 23 or 24, as the case may be. Alternatively, such passages 34, 35 may be formed, as shown in FIG. 3, in part of the valve seat 36 or 37 in the valve casing 21 with which the disk 25 comes into contact.

As has been described above, the system of the present invention supplies a controlled amount of secondary air to the manifold reactor 5 or oxidizing-catalyst converter 8 according to the warm-up or accelerating condition of the engine, thus providing an optimum proportion of oxygen for the exhaust gases being oxidized and reduced. Therefore, the purification of the exhaust gases through conversion of the harmful pollutants CO, HC and NOx into harmless substances can be accomplished most effectively. The present invention is applicable as well to an exhaust system which is not equipped with a manifold reactor such as the manifold reactor 5.

While this invention has been described by means of a specific example in specific embodiments, it is not intended to be limited thereto, for obvious modifications will occur to those skilled in the art without departing from the spirit and scope of the invention.

What is claimed is:

1. An exhaust gas purifying system for motor vehicle engines comprising an exhaust conduit, a reducing-catalyst converter and an oxidizing-catalyst converter installed in said exhaust conduit, an air pump for supplying secondary air, a flow control valve receiving secondary air flow from said air pump, said flow control valve having a first and a second discharge outlet, a first conduit between said first discharge outlet and a point of said exhaust conduit upstream of said reducing-catalyst converter, a second conduit means between said second discharge outlet and a point of said exhaust conduit between said reducing-catalyst converter and said oxidizing-catalyst converter, control means for controlling said flow control valve depending on the operating condition of said engine to control the amount of secondary air passing through said first and second conduit means, a first by-pass conduit means by-passing said control valve and providing communication between said air pump and a point of said exhaust conduit upstream of said reducing-catalyst converter, and a second by-pass conduit means by-passing said control valve and providing communication between said air pump at a point of said exhaust conduit between said reducing-catalyst converter and said oxidizing-catalyst converter.

2. An exhaust gas purifying system for motor vehicle engines comprising an exhaust conduit, a reducing-catalyst converter and an oxidizing-catalyst converter installed in said exhaust conduit, an air pump for supplying secondary air, a flow control valve receiving secondary air flow from said air pump, said flow control valve having a first and a second discharge outlet, a first conduit between said first discharge outlet and a point of said exhaust conduit upstream of said reducing-catalyst converter, a second conduit means between said second discharge outlet and a point of said exhaust conduit between said reducing-catalyst converter and said oxidizing-catalyst converter, control means for controlling said flow control valve depending on the operating condition of said engine to control the amount of secondary air passing through said first and second conduit means, said control valve having inlet means, and by-pass means in said control valve by-passing said secondary air from said inlet means to said first and second discharge outlets.

3. An exhaust gas purifying system according to claim 1 including flow restriction means in said first by-pass conduit means and in said second by-pass conduit means.

4. An exhaust gas purifying system according to claim 2 wherein said control valve has an operating disc element, said by-pass means comprising passages in said disc element.

5. An exhaust gas purifying system according to claim 2 wherein said control valve has a housing, said by-pass means comprising passages in said housing.

* * * * *